Feb. 23, 1937.   B. A. SWENNES   2,071,589
TRANSMISSION MECHANISM
Filed March 24, 1934   2 Sheets-Sheet 2
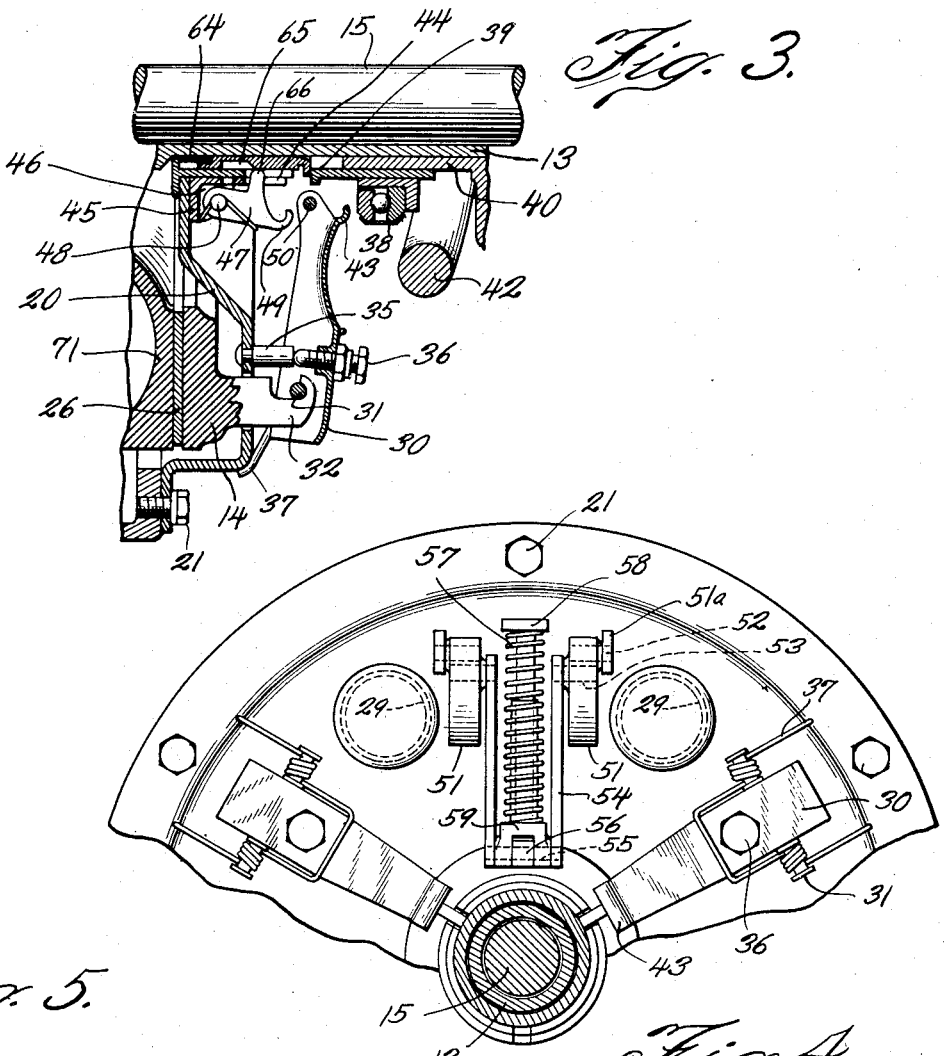
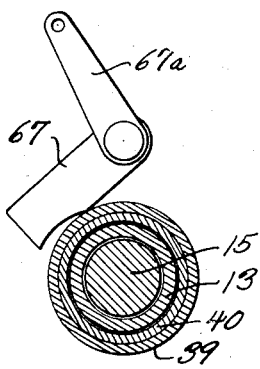
Inventor:
Benjamin A. Swennes Patented Feb. 23, 1937

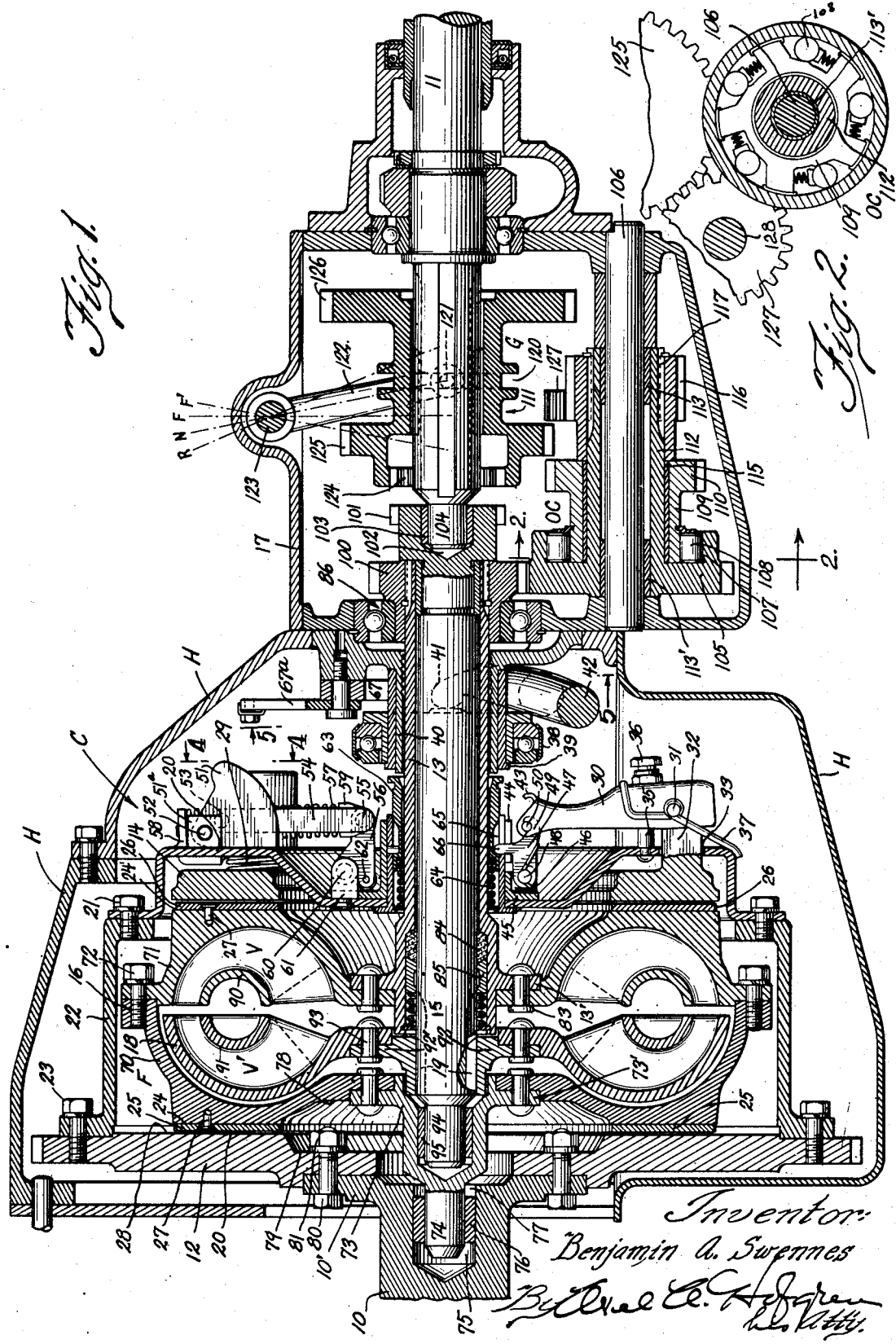

2,071,589

UNITED STATES PATENT OFFICE 2,071,589

TRANSMISSION MECHANISM

Benjamin Arthur Swennes, Rockford, Ill., assignor to Borg-Warner Corporation, Chicago, Ill., a corporation of Illinois Application March 24, 1934, Serial No. 717,216

16 Claims. (Cl. 74—330)

More particularly the invention relates to transmission mechanisms of the type adapted for use in automotive vehicles.

It is an object of the invention to provide a transmission mechanism of new and improved construction embodying a hydraulic power transmitting coupling, so as to obtain the advantages inherent in such a cushioned drive at high speeds, together with means for automatically obtaining a relatively inflexible coupling at lower speeds.

Another object of the invention is to provide a compact transmission mechanism, embodying a mechanical friction clutch and a fluid flywheel together with means for obtaining a cushioned drive at high speeds and a positive drive at low speeds, in which the mechanical clutch and the fluid flywheel are a unitary structure.

Yet another object of the invention is to provide a new and improved transmission mechanism embodying a unitary mechanical clutch and fluid flywheel wherein the fluid from the flywheel is effectively prevented from leaking into the operative parts of the clutch, particularly the clutch surfaces.

Yet another object of the invention is to provide a transmission mechanism embodying a unitary mechanical friction clutch and fluid flywheel having a common member constituting both the driven element of the mechanical clutch and the driving element of the fluid flywheel, with separate, parallel means connecting the common member and the driven element of the fluid flywheel with the shaft to be driven to provide a positive and a cushioned drive respectively at low and high speeds.

Further objects will become readily apparent from the following detailed description, taken in connection with the accompanying drawings, in which Fig. 1 is a longitudinal central section through a preferred form of the invention.

Fig. 2 is a section along line 2—2 of Fig. 1.

Fig. 3 is a fragmentary sectional view of the form of the invention shown in Fig. 1 and showing details of actuating parts for the clutch device.

Figs. 4 and 5 are sectional views taken at the lines 4—4 and 5—5, respectively, of Fig. 1.

While the invention is susceptible of embodiment in many different forms, I have shown in the drawings and will herein describe in detail one such embodiment with the understanding that the present disclosure is to be considered as an exemplification of the principles of the invention and is not intended to limit the invention to the embodiment illustrated. The scope of the invention will be pointed out in the appended claims.

In the form chosen for purposes of disclosure, the invention is embodied in a mechanism for transmitting power from an engine crank shaft 10 to an axially alined, driven shaft 11. Generally, the mechanism comprises an automatic, mechanical, friction clutch device C, located in a housing H, and connected through suitable means including a variable reduction gear system G to the shaft 11 for driving the same positively at low speeds. The clutch device C is also connected to the driven shaft 11 through a fluid coupling F to provide a cushioned drive for the shaft at higher speeds. In the present instance, the fluid coupling F is an element of the clutch device C and forms therewith a unitary structure permitting a compact arrangement of the transmission mechanism. An overrunning or "free wheeling" clutch OC is incorporated in the variable reduction gear system G to permit drive of the shaft 11 at higher speeds to be automatically transferred from the positive gear system G to the fluid coupling F.

More particularly, the crank shaft 10 carries a flywheel 12 which, together with a pressure plate 14 mounted to rotate therewith, forms the driving element of the friction clutch device C, the driven element of which is formed by an annular casing 16 of the fluid coupling F. The position of the elements shown in Fig. 1 of the drawings is for idling speed of the crank shaft 10, under which condition the pressure plate 14 is disengaged from the driven element of the friction clutch. When the speed of the crank shaft 10 is increased above a predetermined amount, the transmission of power from the crank shaft 10 to driven shaft 11 is, as above stated, through a substantially positive drive connection. This drive connection includes the pressure plate 14 brought to bear against a corresponding plate arrangement of the annular casing 16 to clamp the same frictionally between the plate 14 and the flywheel 12 thereby to transmit the rotation of the crank shaft 10 to the annular casing 16. The casing 16 in turn is connected to a tubular sleeve 13 extending into a housing 17 enclosing the gear system G. From the tubular sleeve 13 the power is transmitted to the positive gear system G through the "free wheeling" device OC and thence to the shaft 11 to complete the positive drive connection therefor.

When the speed of the crank shaft is sufficiently increased above such predetermined value, the drive of the shaft 11 is an impositive or cushioned drive through the fluid coupling F. This driving connection includes the driving and the driven element of the clutch device C, the driven element herein being the annular casing 16 of the fluid coupling F which also constitutes the driving element of the fluid coupling. The power thus transmitted to the driving element 16 of the fluid coupling F is transmitted in a well known manner to a runner or driven element 18 of the fluid coupling which in turn is positively splined by keys 19 to a shaft 15. The shaft 15 extends through the tubular sleeve 13 into the gear casing 17 where it connects through a system of gearing with the shaft 11 and drives the same by overrunning the positive drive connected through the "free wheeling" device OC.

The pressure plate 14, which cooperates with the flywheel 12 to constitute the driving element of the clutch device C, is carried on a dished cover or back plate 20 secured by screws 21 to an annular ring member 22 to form with the ring member a clutch housing. Ring member 22 is in turn secured to the rear surface of the flywheel 12 by means of screws 23. The driven element of clutch C, herein casing 16 of the fluid coupling F, is provided with flat end surfaces 24 and 24' to which clutch facing discs 25 and 26 are secured by rivets 27, so as to be in opposed relation to the flat surface 28 of flywheel 12 and pressure plate 14. Casing 16 is slidably mounted on its longitudinal axis in order that it may shift into contact with the flywheel when the force of pressure plate 14 is exerted toward the left as viewed in Fig. 1 of the drawings. In this manner the casing 16 can be frictionally clamped between the two members of the driving element of the friction clutch device and the rotation of the crank shaft 10 imparted thereto.

The pressure plate 14, hereinbefore referred to, is arranged to be moved axially against the action of circumferentially spaced loading springs 29 to release the frictional connection of the clutch plates. As illustrated herein, the releasing action is obtained by means of a plurality of throwout fingers 30. The outer ends of these fingers carry pins 31 engaging with bosses 32, preferably square in cross section, projecting from the pressure plate through apertures 33 in the back plate 20, the fingers 30 being fulcrumed on buttons 35 on the housing by means of adjustable screws 36. The throwout fingers are maintained on the bosses by means of torsion springs 37 coiled on the pins 31 and having the ends thereof engaging the fingers and housing respectively. The springs tend to shift the fingers in a counterclockwise direction about their fulcrums thus preventing rattling as well as taking up clearance at the loose connection where the pins engage the bosses.

Disregarding for the moment the automatic feature of the clutch, a manual control is provided for disengaging the clutch through the use of the usual clutch pedal mechanism. This comprises a throwout bearing 38 slidably mounted on a sleeve 39 which in turn is slidable on a tubular extension 40 of the housing H and surrounds the tubular sleeve 13. The throwout bearing 38 is adapted to be shifted to the left by means of a fork 41, secured to shaft 42 and engaging the bearing, in which movement, bearing 38 contacts with the inner ends 43 of the throwout fingers 30. The lever action of fingers 30 about the fulcrums 35, as the tips 43 of the fingers 30 are forced toward the left in Fig. 1, causes the pins 31 to retract the pressure plate and release the casing 16.

The foregoing description embodies the usual features of a conventional, single-disc clutch which is normally engaged and is disengaged by the operator at will. There is also illustrated an automatic mechanism that controls engagement and disengagement of the clutch at a predetermined rotative speed, unless the automatic mechanism is locked out of control, to convert the clutch into a conventional one wherein the clutch is always engaged unless deliberately held out of engagement by the operator.

The automatic mechanism which acts to hold the clutch disengaged below a predetermined speed of the drive shaft 10 and operates by centrifugal force to engage the clutch above such speeds, acts through a sleeve 44 concentric with the sleeve 13 and slidable longitudinally thereon. The sleeve 44 has a radial flange 45 and lugs 46 at its forward end and carries pawls 47 pivoted to said lugs at 48, the pawls having hooks 49 engaging pins 50 on the inner ends of the throwout fingers 30. When the hooks are so engaged and with the automatic mechanism holding the sleeve against the housing 20, as shown, the clutch is automatically disengaged because the pawls 47 act through the fingers 30 to retract the pressure plate 14. When the automatic mechanism is, by centrifugal force, caused to release the sleeve 44, the latter moves to the right in response to pressure from the springs 29 which ordinarily tend to hold the pressure plate 14 in clutch engaged relation and act through the throwout fingers and pawls to pull sleeve 44 to the right. In such movement the throwout fingers 30 pivot to permit the clutch to become engaged. When the pawl hooks 49 are disengaged from the pins 50 the throwout fingers are fully under the control of the throwout bearing 38 and thus the clutch becomes a conventional, manually operated one which remains fully engaged irrespective of the automatic control.

The mechanism for automatically controlling engagement or disengagement of the clutch is attached to the dished cover plate 20 of the clutch housing and comprises pairs of spaced weight members 51 pivotally mounted on spaced lugs 51ᵃ by pins 52. The weights are so formed and pivoted as to swing outwardly in a radial plane relative to the clutch axis under the influence of centrifugal force. Each member 51 carries fulcrum pins 53 offset relative to the pivots 52, which pins 53 are connected by links 54 to a pin 55 at the outer end of a lever 56. A coiled spring 57 is interposed between a lug 58 on the plate 20 and a collar 59 on a rod pivoted at its inner end on pin 55 and extending within the spring to guide the same.

Each lever 56 to which the links 54 are connected and against which the spring 57 acts, is fulcrumed at 60 to a bracket 61 attached to the housing plate 20. The lever carries an offset roller 62 bearing against the flange 45 of the sleeve 44. The arrangement being such that the combined forces of the springs 57 acting through the levers 56 and rollers 62 are sufficient to overbalance the springs 29 which tend to hold pressure plate 14 in clutch engaged relation and act on sleeve 44 through the throwout fingers 30, thus holding the sleeve 44 in the position indicated in the drawings until centrifugal force swings the weights outwardly to release the pressure of the rollers 62 against the flange of sleeve 44.

The springs 57 act to oppose the outward movement or response of the weights to centrifugal force acting thereon. It will be evident, therefore, that the degree of preloading of the springs will determine the rotative speed at which the weights will move outwardly, since centrifugal force varies as the square of the rotative speed.

Automatic engagement of the clutch is dependent upon the overbalancing of the springs 57 by the combined action of the springs 29, acting through fingers 30 on the sleeve 44, and the weights 51, acting through links 54, the springs 57 having their force multiplied by the levers 56 while the loading springs 29 have their force reduced by the leverage of the throwout fingers. In practice, the springs 57 overbalance the opposing forces to a predetermined extent dependent on the desired rotative speed to be attained before clutch engagement, the excess spring force acting to hold the weights in the position shown until increasing centrifugal force absorbs the spring force. Since the variables are under the designer's control, the clutch can be designed to operate at a predetermined speed and to have a predetermined maximum torque capacity and rate of engagement.

Although the clutch may be automatically and fully engaged it can still be manually disengaged at any time. Manual disengagement can be accomplished at any time by manually moving bearing 38 to the left where the bearing will act on the inner ends 43 of throwout fingers 30 and cause the same to pivot about fulcrums 35 to release the pressure on plate 14 as well as forcibly to return the automatic mechanism to the position shown in the drawings. The effect of this is essentially to overcome the centrifugal force by a directly applied force of greater magnitude acting through the levers.

Movement of the bearing 38 to the left also serves to disengage pawls 47 from fingers 30 to remove the automatic mechanism from control of the clutch. To that end a sleeve 63 is slidably mounted on sleeve 13 within sleeve 44 and urged rearwardly by a compression spring 64. The sleeve 63 is formed with longitudinal slots 65 to receive the ends of inwardly projecting fingers 66 on the pawls 47. At their rearward ends the slots are formed with cam surfaces which engage the fingers 66, when the sleeve is moved forward, to cause the hooks 49 to move radially outwardly out of engagement with pins 50 on the fingers 30. Forward movement of the sleeve 63 to effect such disengagement is imparted thereto as an incident to movement of the bearing 38 acting through sleeve 39 movable therewith and abutting the sleeve 63. The sleeve 63 may be locked in its forward position permanently to remove the automatic control by means of a dog 67 preventing return of the sleve 39 to normal position. The dog 67 may be integral with a manually controlled lever 67ᵃ as shown in Figure 5.

Thus it is believed apparent from the foregoing description that the clutch may be fully automatic in operation, disengaging at some predetermined idling speed and engaging when the speed rises above the predetermined value. While under automatic control, the clutch may still be disengaged manually. Furthermore, the hooks 49 may be permanently disengaged from the pins 50 of the fingers 30, to remove the automatic control and cause the clutch to assume the character of a conventional manually operated clutch.

Returning to the description of the clutch device proper, the clutch device C is a composite, unitary structure of a mechanical friction clutch and a fluid coupling in which the annular casing 16 of the fluid coupling constitutes the driven element of the friction clutch and the driving element of the fluid coupling. The casing 16 is formed of two opposing sections 70 and 71 secured together at their peripheries by screws 72, and is herein mounted on a composite hollow shaft comprising the tubular extension 13 on the right and a recessed portion 73 on the left. Portion 73 is extended in the form of a trunnion at 74 where it bears slidably in the complementarily recessed portion 75 of crank shaft 10 and is rotatable therein on bearing 76. Bearing 76 is cut back slightly at 77 to permit the trunnion to slide longitudinally to the left from the position shown here. Section 70 of casing 16 is secured to the recessed portion 73 by riveting to a flange 73' and is depressed inwardly at 78 to permit the unobstructed rotation of the heads of the rivets by which the section is secured to the portion 73. Opposite the depressed portion of casing 16 is a similar depressed portion 79 of flywheel 12 which permits the unobstructed rotation of the annular casing 16 past the protruding ends of screw and nut devices 80 and 81 by means of which the flywheel is secured to a flange 10' on the crank shaft 10.

Section 71 of casing 16 is joined to flange 13' of tubular sleeve 13 by rivet means 83. A packing ring 84 surrounds shaft 15 within the recessed end of sleeve 13 and is automatically taken up by spring pressed ring 85. Sleeve 13 surrounding shaft 15 extends through an aperture in housing H and continues, slidably supported on shaft 15, through a ball bearing support 86 into gear casing 17. Thus when the pressure plate 14 is permitted to move to the left frictionally to clamp between itself and the flywheel 12 the casing 16, the transmission of power will be a positive one from casing 16, acting as the driven element of the mechanical friction clutch, through the flange 13' and its sleeve 13 to the gear casing where it is taken up by the system of reduction gearing through the "free wheeling" device OC to driven shaft 11.

As will be readily apparent from the drawings, the invention in its preferred form effectively prevents the leakage of fluid from the interior of the casing 16 onto the clutch surfaces. At the left hand end of casing 16 the recessed portion 73 of the composite shaft is riveted to and rotates with the casing completely surrounding the adjacent end of shaft 15. At the right hand end of the casing the sleeve 13 and its flange 13', which is secured to the casing, prevents the leakage of any fluid onto the clutch surfaces, fluid leaking along the shaft 15 being discharged into the gear casing 17 where it can do no harm.

The impositive or cushioned drive of the shaft 11 taking place at an increased speed of the crank shaft is through the fluid coupling F, commonly known as a fluid flywheel, composed of the driving casing 16 and the driven runner 18. Section 71 of the driving element 16 of the fluid flywheel is provided with angularly spaced, radially extending vanes V which are somewhat semi-circular in form and project from the inner wall of the casing. The vanes are intersected by a semi-cylindrical wall 90, which, with the vanes, forms radial fluid ducts decreasing in cross sectional area toward the outer portion of the casing because the wall 90 is nearer to the periphery than to the center of the section. The runner 18 is positioned in opposed relation to the impeller vanes of the driving element and conforms somewhat to the shape of the adjacent portion 70 of the casing 16. The runner is provided with vanes V', similar to the vanes V on the driving element, and in the form illustrated in the drawings, the runner vanes are intersected by a corresponding annular semi-cylindrical wall 91. The system of vanes V and V' may have segmental pieces cut from alternate vanes at the inner ends as indicated by the dotted lines on the drawings.

The annular casing is filled with a suitable fluid such as oil and is provided with an opening and plug, not shown, for replenishment of the supply when necessary. During the operating of the fluid coupling, fluid is forced outwardly through the ducts between the vanes in the driving element or impeller and into the ducts formed on the driven element or runner in a well known manner. At relatively low speeds the slip is high, but as the speed of the driving element increases the torque transmitted to the runner increases until a speed is attained where the runner is rotated by the impeller with a relatively small amount of slip, thus forming a substantially direct and cushioned drive between the casing 16 rotating with the friction clutch and the runner 18. In turn the runner 18 is connected to flange 92' of a hub portion 92 by rivets 93 and hub 92 is in turn attached to shaft 15 by keys 19. Shaft 15 has a portion of reduced diameter at its left hand end forming a trunnion 94 which is rotatably mounted in a sleeve bearing 95 carried by the recessed portion 73 of the composite shaft. Thus the power transmitted to runner 18 is carried to shaft 15 and thence to the gear casing 17 where it connects with a system of gearing in parallel arrangement to that connected with sleeve 13.

In the present form of the invention the sleeve 13 and the shaft 15 constitute the elements of the positive and cushioned drive mechanism respectively which extend into gear casing 17, the sleeve 13 having a gear 100 keyed thereto and shaft 15 having a jaw clutch 101 formed thereon. The jaw clutch 101 may be provided with a recess 102 in its right hand end and carries a sleeve bearing 103 into which a reduced portion or trunnion 104 on the shaft 11 projects. The sleeve 13 and gear 100 carried thereon a driven whenever the automatic clutch device is engaged. Thus in the normal operation of the present form of the invention the gear 100 would be driven when the speed of shaft 10 is increased above normal idling speed of the engine. This direct drive is arranged to be transmitted to shaft 11 to drive the shaft in forward and reverse directions. As illustrated in the drawings, the means for connecting gear 100 to shaft 11 comprises a gear 105 rotatably mounted on a parallel stub shaft 106; the overrunning clutch or free-wheeling device OC mounted in a recess 107 in the gear 105 and comprising rollers 108 and a cam sleeve 109; a gear 110 formed integrally with the cam 109 and a shiftable cluster gear element 111 splined on shaft 11. The gear 105 is provided with a sleeve portion 112 rotatably mounted on stub shaft 106 by means of bushings 113 and 113', the cam sleeve 109 and gear 110 being rotatably mounted on sleeve portion 112 by means of bushing 115. A gear 116 is preferably splined at 117 to sleeve portion 112 of the gear 105 for purposes hereinafter more fully pointed out.

When the speed of the crank shaft 10 is just slightly above idling speed of the engine, the slip of the fluid coupling F is substantially 100% and thus no torque and no rotation is imparted to the shaft 15 and its jaw clutch 101. As the speed of the crank shaft increases the slip of the fluid coupling decreases until substantially 100% of the torque is transmitted to the shaft 15 and the jaw clutch 101. This torque may be transmitted to the driven shaft 11 through the cluster gear element 111 when suitably engaged with the jaw clutch 101.

As illustrated herein, the shiftable cluster gear element 111 has a peripheral groove 120 in which a pin 121, carried on an operating arm 122, engages. The arm 122 is secured to a transversely extending shaft 123 and is adapted for manual operation by a suitable lever (not shown) analogous to the well known gear shift lever of an automotive vehicle. The element 111 has an internal clutch element 124 formed thereon at its left-hand end, and an intermediate external gear 125 and a larger external gear 126 at its right-hand end. The clutch element 124 is arranged to be meshed with the jaw clutch 101 on the shaft 15 when the arm 122 is moved to the position F, in which position of the element 111 the gear 125 meshes with the gear 110. In this position of the element 111 the drive of the shaft 11 may be either a positive one through the sleeve 13 and the "free wheeling" clutch OC or a cushioned drive through the fluid coupling F and the shaft 15 depending upon the speed of rotation of the crankshaft. When the speed of the crankshaft 10 is just slightly above idling speed of the engine the drive is a positive one because the slip of the fluid coupling is so large that substantially no torque is transmitted to the jaw clutch 101. As the speed increases, however, the slip becomes less and the torque transmitted becomes greater until the jaw clutch 101, because of its more direct connection to the shaft 11 takes over the drive thereof, overrunning the free wheeling clutch OC.

As illustrated in Fig. 1 of the drawings, the element 111 is in the neutral position N when the gears are disengaged. Upon movement of the element 111 toward the right to the position R, the gear 125 meshes with a reverse gear 127 meshing with the gear 116 and mounted on a shaft 128 parallel and to the rear of the shaft 106. In order to obtain a low forward speed suitable for heavy driving purposes, the element 111 may be shifted to an extreme left-hand position F' in which the gear 126 meshes with the gear 116. It will be apparent that since the gear 116 is splined directly to the sleeve 112 of the gear 105 the slow forward connection and the reverse connection are independent of the "free wheeling" device OC enabling the engine to be used for braking purposes.

I claim as my invention:

1. A transmission mechanism for automotive vehicles comprising, in combination, with a drive shaft and a driven shaft, a composite clutch device including a mechanical friction clutch having a driving element rotatable with the drive shaft and a driven element; means automatically engaging the elements of said mechanical clutch at a predetermined rotative speed of the drive shaft; means including an overrunning clutch connecting the driven element of said mechanical clutch to the driven shaft to provide a positive drive therefor; a fluid flywheel also included in said composite clutch device and operative coincidental with a speed in excess of such predetermined speed to take over the drive of the driven shaft, comprising an annular casing constituting the driven element of said mechanical clutch and the driving element of said fluid flywheel, and a runner forming the driven element of said fluid flywheel; and means independent of said first mentioned means connecting said runner with the driven shaft.

2. A transmission mechanism for automotive vehicles comprising, in combination with a drive shaft and a driven shaft, a driving element of a mechanical clutch comprising a flywheel and an opposed pressure plate both rotatable with the drive shaft, a fluid coupling comprising an annular casing interposed between said flywheel and said pressure plate and a runner within said casing forming the driven element of said fluid coupling, said annular casing forming both the driven element of said mechanical clutch and the driving element of said fluid coupling, a shaft rigid with said runner, a tubular sleeve rigid with said casing and slidable on said shaft, means coupling said shaft to the driven shaft, and independent parallel means coupling said tubular sleeve to the driven shaft, said last mentioned means including an overrunning clutch.

3. A transmission mechanism for automotive vehicles comprising, in combination with a drive shaft and a driven shaft, a mechanical friction clutch having the driving element thereof connected to the drive shaft, a fluid coupling having a driven element, means connecting the driven element of the fluid coupling to the driven shaft, a member common to said mechanical clutch and to said fluid coupling constituting the driven element of the former and the driving element of the latter, and means including a freewheeling device connecting said common member to the driven shaft.

4. In combination with a driving shaft and a driven shaft, an impositive clutch having driving and driven elements, a relatively positive clutch having a driving element and a driven element constituting the driving element of said impositive clutch, connecting means including speed reducing mechanism and an overrunning clutch between the driven element of said relatively positive clutch and said driven shaft, and a coupling between the driven element of said impositive clutch and said driven shaft.

5. A transmission mechanism for automotive vehicles comprising, in combination with a drive shaft and a driven shaft, a mechanical friction clutch comprising a driving element rotatable with the drive shaft, a driven element and means operating automatically at a predetermined rotative speed of the drive shaft to engage said elements; means including a freewheeling device connecting said driven element to the driven shaft; a fluid coupling incorporated in said driven element of the mechanical clutch; and means connecting the driven shaft to the drive shaft through said fluid coupling and independently of the means including said freewheeling device, said fluid coupling operating at a speed in excess of such predetermined speed to take over the drive of the driven shaft.

6. In a transmission mechanism for connecting a drive shaft having a recess at one end and a driven shaft, a mechanical clutch having the driving element thereof connected to the drive shaft, said driving element comprising a flywheel secured to the drive shaft, a pressure plate opposed to said flywheel, and a housing carried by said flywheel and supporting said pressure plate; a fluid coupling comprising an annular fluid tight casing carrying integral impeller blades forming a driving element and a runner enclosed in said casing forming a driven element, said annular casing being interposed coaxially between said flywheel and said pressure plate and enclosed within said housing; friction disks attached to the ends of said annular casing adapting the same to constitute the driven element of said mechanical clutch; a composite tubular sleeve shaft rigid with said annular casing and having a closed end slidably trunnioned within the recess in the drive shaft, a solid shaft rigid with said runner and extending through the other end of said composite shaft, one end of said solid shaft being trunnioned within a recess in said composite tubular shaft and packing interposed between said tubular shaft and said solid shaft.

7. In a transmission mechanism, a drive shaft having a recess at one end; a driven shaft; a mechanical clutch having the driving element thereof connected to said drive shaft; a fluid coupling comprising an annular fluid tight casing composed of separable sections one of which carries impeller means to form a driving element of the casing, and a runner enclosed within the casing forming the driven element, said casing being disposed in cooperative relationship to the driving element of the mechanical clutch to form the driven element thereof; a composite hollow shaft comprising a closed end portion rigid with one section of said casing and terminating in a trunnion journaled in the recess in said drive shaft and a sleeve portion rigid with the other section of said casing and carrying a gear for connection with said driven shaft, a solid shaft rigid with said runner journaled at one end in said closed end portion and extending through said sleeve portion of the composite shaft; and packing interposed between said sleeve portion and said solid shaft.

8. In a transmission mechanism for connecting a drive shaft and a driven shaft, a composite unitary mechanical clutch and fluid coupling, comprising a flywheel and an oppositely disposed pressure plate rotatable with the drive shaft and forming the driving element of the mechanical clutch, an intermediate shaft coaxial with the drive shaft and having a driving connection with the driven shaft, a runner fast on said intermediate shaft and forming the driven element of the fluid coupling, a casing interposed between said flywheel and said pressure plate forming the driven element of the mechanical clutch and the driving element of the fluid coupling, and a tubular sleeve rigid with said casing and slidable on said intermediate shaft, said sleeve having a driving connection with the driven shaft independent from the connection of said intermediate shaft with the driven shaft.

9. In a transmission mechanism for connecting a drive shaft and a driven shaft, a composite unitary mechanical clutch and fluid coupling, comprising means including a pressure plate rotatable with the drive shaft forming the driving element of the mechanical clutch, a runner forming the driven element of the fluid coupling, a shaft rigid with said runner and adapted to have a driving connection with the driven shaft, a housing enclosing said runner and disposed opposite said pressure plate to constitute both the driven element of the mechanical clutch and the driving element of the fluid coupling, and means rigid with said casing adapted to have an independent driving connection with the driven shaft.

10. In a transmission mechanism for connecting a driving shaft and a driven shaft, a composite unitary clutch device comprising a mechanical friction clutch having a driving element and a driven element, said driven element being adapted for connection with the driven shaft, and a fluid flywheel having a driving element and a driven element, said driven element of the fluid flywheel being adapted for independent driving connection with the driven shaft, the driven element of said mechanical clutch and the driving element of said fluid flywheel being a single common member to provide a compact construction.

11. In a transmission mechanism for connecting a drive shaft and a driven shaft, a composite unitary clutch device comprising a mechanical friction clutch having a driving element rotatable with the drive shaft, and a fluid flywheel having a casing forming the driven element of said mechanical friction clutch and the driving element of said fluid flywheel, said casing having a driving connection with the driven shaft, and a runner within said casing forming the driven element of said fluid flywheel, said runner also having a driving connection with the driven shaft.

12. In a transmission mechanism, in combination, a friction clutch device comprising driving and driven elements, said driving element including two laterally opposing faces spaced wide apart as compared to a friction clutch having a single disc, and having a fluid coupling positioned therebetween all within a common transmission housing, the outer sides of said coupling forming the driven element of the friction clutch device and whose own inner driven element, when acted upon by the fluid contained therein in a known manner, rotates within and jointly with the driven element of said friction clutch throughout the entire span of the clutch device within said housing above certain speeds.

13. A transmission mechanism comprising a friction clutch including a driving element and a hollow driven element, a fluid clutch including said hollow element as a driving element thereof and a driven element complemental to and within said hollow element, and concentric driven members in respective operative connection with said driven elements.

14. The combination with a driven shaft of a rotatable friction clutch including a driving element and a driven element having fluid propelling means, a fluid clutch including a driven element disposed for propulsion by said fluid propelling means during rotation of the driven element of said friction clutch, means comprising a one way driving device and effecting an operative coupling between the driven element of said friction clutch and said driven shaft, and an independent coupling between said driven shaft and the driven element of said fluid clutch.

15. A transmission mechanism comprising a friction clutch including a driving element and a driven element having fluid propelling means, a fluid clutch including said fluid propelling means as a driving element thereof and a driven element complemental with said propelling means, and coaxial driven members in respective operative connection with said driven elements.

16. A transmission mechanism comprising a friction clutch including a driving element and a hollow driven element, a fluid clutch including said hollow element as a driving element thereof and a driven element complemental to and within said hollow element, and coaxial driven members in respective operative connection with said driven elements.

BENJAMIN ARTHUR SWENNES.